May 9, 1950 P. MATTIESON 2,506,883
WEEDLESS FISHHOOK
Filed March 11, 1949

*INVENTOR.*
PAUL MATTIESON.
BY
*Samuel Weisman*
ATTORNEY.

UNITED STATES PATENT OFFICE 2,506,883

WEEDLESS FISHHOOK

Paul Mattieson, Dearborn, Mich.

Application March 11, 1949, Serial No. 80,820

5 Claims. (Cl. 43—43.6)

This application is a continuation in part of my copending application Serial No. 41,345, of July 25, 1948, now abandoned. The invention pertains to a novel non-snagging fish hook designed to be attached to a fish lure.

It is well known that unbaited fish hooks frequently become snagged in weeds. The principal object of this invention is to provide a device that guards the sharp end of the hook against such snagging. Another object is to provide, in the same construction, a part that wedges the flesh against the sharp end or prong of the hook, so that escape becomes practically impossible.

These objects are accomplished by means of an attachment that is fastened to a conventional fish hook of the type comprising a straight shank having a bent and pronged end. The attachment is a length of rather fine wire shaped to form a pair of fingers and a double strand, all having one end in common. This end is fastened to the free end of the shank at or near its eyelet. The fingers are positioned so that their free ends extend somewhat beyond the prong and lie outwardly and at opposite sides thereof. The double strand has its unfastened end slidably mounted on the shank, preferably by means of a coil in the wire. The double strand is also bowed towards the fingers.

The fingers constitute a guard that prevents the prong from snagging in the weeds. However, they are of such resiliency that a bite will depress them to expose the prong for penetration. The bowed double strand functions to wedge the flesh of the catch against the prong, whereby escape is practically impossible, as described in the copending application.

The present invention differs in providing the bowed double strand with one end slidable on the shank. This arrangement permits the bait to be inserted and held within the bow or between the threads of the double strand, because of the resiliency of the wire. In such case the hook is left bare, but may also be baited if desired. However, a live bait held by the wire will remain alive longer than on the hook.

The invention is fully disclosed by way of example in the following description and in the accompanying drawings in which.

Reference to these views will now be made by use of like characters which are employed to designate corresponding parts throughout.

Figure 1:
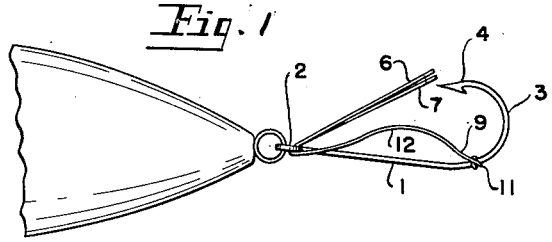
Figure 1 is a side elevation of the device attached to a fish hook which is connected to a fish lure.
Figure 2:
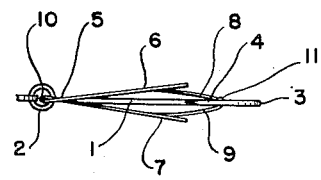
Figure 2 is a plan view of the device.
Figure 3:
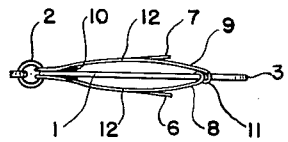
Figure 3 is another plan view showing the bowed member spread to receive bait between the strands.
Figure 4:
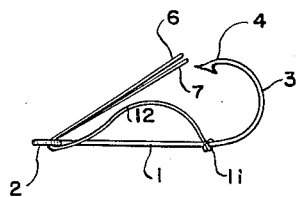
Figure 4 is a side elevation showing the bowed member raised to receive bait in the arch.

In Figure 1 is shown a conventional fish hook including a shank 1 with an eyelet 2 at one end thereof, the other end being bent at 3 through an arc of about 180 degrees and formed at the extremity with the usual prong 4. The appliance that constitutes the invention comprises a length of wire shaped by suitable dies to the form shown.

The device is substantially V-shaped in side elevation with both free ends of the wire being disposed at the free end of one of the sides of the V. The strands constituting this side are crossed at the vertex at 5, thus forming a pair of fingers 6 and 7. These fingers diverge toward the hook 4 and extend somewhat beyond the point thereof. The free ends of the fingers lie at opposite sides of the point and outwardly thereof, for a purpose that will presently be described.

The other side of the V is a continuous double strand comprising threads 8 and 9. The device is fixed to the shank 1 near the eyelet 2, preferably by soldering the threads to the shank as indicated by the numeral 10. At the other end, the double strand is slidably mounted on the shank, preferably by means of an integral coil 11 encircling the shank. Also, the double strand is bowed at 12 toward the fingers 6, 7. It will be understood that the preformed attachment may be assembled on the fish hook in any suitable manner.

The eyelet 2 may be attached to a lure as well known in the art. The bait is fitted either beneath the bow or between the threads 8, 9. In this operation the wire is temporarily distorted and, because of its resiliency, springs back into shape to retain the bait. The prong 4 need not be baited, although it may be, and a live bait will live longer if held by the wire than by the prong.

A fish attracted by the lure and biting on the hook will bite with sufficient pressure to depress the fingers 6, 7, thereby exposing the prong 4 for penetrating into the roof of the mouth of the fish. In other words, the fingers are of such resiliency as to yield under pressure. The pull on the line or the resistance of the catch will cause the bowed double strand to wedge the flesh against the prong. Escape is then practically impossible.

The invention is applicable in like manner to multiple hooks, and the device may be produced as a multiple unit. Artificial bait is not necessary but may be used if desired.

Although a specific embodiment of the invention has been illustrated and described, it will be understood that various alterations in the details of construction may be made without departing from the scope of the invention as indicated by the appended claims.

What I claim is:

1. In combination with a fish hook having a shank and a bent end terminating in a hook, a resilient member between said shank and hook having one end secured near the free end of said shank and its other end slidably attached to said end, said member consisting of two mutually adjacent and slightly spaced lengths of wire bowed apart from each other and bowed toward said hook.

2. In combination with a fish hook having a shank and a bent end terminating in a hook, a bowed resilient member between said shank and hook having one end secured adjacent to the free end of said shank and its other end slidable lengthwise on said shank at said bent end, and a pair of resilient fingers extending from the secured end of said member toward said hook and terminating at opposite sides and laterally of said hook.

3. In combination with a fish hook having a shank and a bent end terminating in a hook, a bowed resilient member between said shank and hook having one end secured adjacent to the free end of said shank and its other end slidable lengthwise on said shank at said bent end, and a pair of resilient fingers extending from the secured end of said member toward said hook and terminating at opposite sides and laterally of said hook, said member and fingers consisting of a continuous bent length of wire forming two mutually adjacent and slightly spaced strands in said bowed member.

4. In combination with a fish hook having a shank and a bent end terminating in a hook, a bowed resilient member between said shank and hook having one end secured adjacent to the free end of said shank and its other end slidable lengthwise on said shank at said bent end, and a pair of resilient fingers extending from the secured end of said member toward said hook and terminating at opposite sides and laterally of said hook, said member and fingers consisting of a continuous bent length of wire forming two mutually adjacent and slightly spaced strands in said bowed member, said wire being coiled around said shank at the slidably attached end of said member.

5. An attachment for a fish hook comprising a length of flexible wire doubled and bent to form a substantially V-shaped member, one side of said member consisting of a pair of fingers diverging from the apex, and the other side consisting of two strands bowed toward said fingers, the free end of said bowed member being coiled for slidable mounting on the shank of a fish hook.

PAUL MATTIESON.

REFERENCES CITED

The following references are of record in the file of this patent:

UNITED STATES PATENTS

| Number | Name | Date |
| --- | --- | --- |
| 564,517 | Hastings | July 21, 1896 |
| 1,150,386 | Rife | Aug. 17, 1915 |
| 1,323,394 | Jones | Dec. 2, 1919 |
| 2,160,347 | Walsh | May 30, 1939 |